US009749219B2

(12) United States Patent
Dugue et al.

(10) Patent No.: US 9,749,219 B2
(45) Date of Patent: Aug. 29, 2017

(54) METHOD OF OPTIMIZING ROUTING IN A CLUSTER COMPRISING STATIC COMMUNICATION LINKS AND COMPUTER PROGRAM IMPLEMENTING THAT METHOD

(75) Inventors: Sebastien Dugue, Saint Theoffrey (FR); Jean-Vincent Ficet, La Chapelle Blanche (FR); Yann Kalemkarian, Grenoble (FR); Nicolas Morey-Chaisemartin, Saint-Martin D'Heres (FR)

(73) Assignee: BULL SAS, Les Clayes sous Bois (FR)

( * ) Notice: Subject to any disclaimer, the term of this patent is extended or adjusted under 35 U.S.C. 154(b) by 609 days.

(21) Appl. No.: 13/698,957

(22) PCT Filed: May 13, 2011

(86) PCT No.: PCT/FR2011/051080
§ 371 (c)(1),
(2), (4) Date: Nov. 19, 2012

(87) PCT Pub. No.: WO2011/144848
PCT Pub. Date: Nov. 24, 2011

(65) Prior Publication Data
US 2013/0067113 A1    Mar. 14, 2013

(30) Foreign Application Priority Data

May 20, 2010 (FR) ..................... 10 02126

(51) Int. Cl.
*G06F 15/16*     (2006.01)
*G06F 15/18*     (2006.01)
(Continued)

(52) U.S. Cl.
CPC .................. *H04L 45/125* (2013.01)

(58) Field of Classification Search
CPC ....... G06F 15/173; G06F 15/116; G06F 15/18
(Continued)

(56) References Cited

U.S. PATENT DOCUMENTS 7,334,045 B1 *  2/2008  Jacobson ............... H04L 45/04
                                                    709/238
7,889,652 B1 *  2/2011  Minei .................. H04L 43/0882
                                                    370/230
(Continued)

FOREIGN PATENT DOCUMENTS

EP         1 087 576 A2     3/2001

OTHER PUBLICATIONS

Hoefler, Torsten et al., "Optimized Routing for Large-Scale InfiniBand Networks," High Performance Interconnects 2009, 17th IEEE Symposium on High Performance Interconnects, Aug. 25, 2009, pp. 103-111, XP031528530.
(Continued)

*Primary Examiner* — Kevin Bates
*Assistant Examiner* — Mark A Scott
(74) *Attorney, Agent, or Firm* — Pillsbury Winthrop Shaw Pittman LLP (57) ABSTRACT

The invention relates in particular to the optimization of routing in a cluster comprising a plurality of nodes and static communication links connecting nodes of the plurality of nodes, said routing being based on load levels associated with the communication links. In order to establish a connection between at least two nodes of the cluster that have been identified (505), at least one route is determined (510) that connects the identified nodes according to the communication links, said route being determined according to the nodes identified, communication links and at least one load level associated with each communication link. A determined route is selected. Subsequently, a value of weight
(Continued)

associated with the selected route is estimated (520) and a load level associated with each communication link of the selected route is incremented (525).

11 Claims, 5 Drawing Sheets

(51) Int. Cl.
*G06F 15/173* (2006.01)
*H04L 12/729* (2013.01)

(58) Field of Classification Search
USPC .......................................................... 709/241
See application file for complete search history.

(56) References Cited

U.S. PATENT DOCUMENTS

| | | | | |
|---|---|---|---|---|
| 8,175,107 | B1* | 5/2012 | Yalagandula | H04L 45/66 370/408 |
| 2003/0046396 | A1* | 3/2003 | Richter | G06F 9/505 709/226 |
| 2003/0126283 | A1* | 7/2003 | Prakash | H04L 67/1008 709/238 |
| 2003/0158940 | A1* | 8/2003 | Leigh | 709/226 |
| 2004/0042402 | A1* | 3/2004 | Galand | H04L 1/22 370/237 |
| 2004/0133634 | A1* | 7/2004 | Luke et al. | 709/203 |
| 2004/0203827 | A1* | 10/2004 | Heiner | H04L 45/24 455/452.1 |
| 2005/0038909 | A1* | 2/2005 | Yoshiba | H04L 12/1886 709/241 |
| 2005/0149600 | A1* | 7/2005 | Herring | H04L 45/00 709/200 |
| 2005/0243723 | A1* | 11/2005 | Randriamasy | H04L 45/52 370/235 |
| 2006/0002385 | A1* | 1/2006 | Johnsen et al. | 370/389 |
| 2006/0092976 | A1* | 5/2006 | Lakshman | H04L 45/04 370/469 |
| 2006/0101104 | A1* | 5/2006 | Bhanot | G06F 9/5066 708/105 |
| 2006/0114918 | A1* | 6/2006 | Ikeda et al. | 370/408 |
| 2006/0168339 | A1* | 7/2006 | Shapiro et al. | 709/241 |
| 2006/0253621 | A1* | 11/2006 | Brewer | G06F 3/0605 710/40 |
| 2006/0268691 | A1* | 11/2006 | Ramanan | H04L 45/123 370/229 |
| 2007/0076601 | A1* | 4/2007 | Wang | H04L 41/083 370/229 |
| 2007/0189283 | A1* | 8/2007 | Agarwal | H04L 45/00 370/388 |
| 2008/0063028 | A1* | 3/2008 | Lekkas et al. | 375/130 |
| 2008/0192654 | A1* | 8/2008 | Block | G06F 13/387 370/257 |
| 2008/0256079 | A1 | 10/2008 | Saha et al. | |
| 2008/0285458 | A1* | 11/2008 | Lysne | H04L 45/00 370/238 |
| 2008/0288646 | A1* | 11/2008 | Hasha | H04L 67/1095 709/228 |
| 2009/0168653 | A1* | 7/2009 | St. Pierre | H04L 45/00 370/238 |
| 2009/0238189 | A1* | 9/2009 | Tripathi et al. | 370/395.32 |
| 2009/0245113 | A1* | 10/2009 | Kamiya | 370/238 |
| 2009/0296719 | A1* | 12/2009 | Maier | H04L 45/12 370/400 |
| 2010/0020806 | A1* | 1/2010 | Vahdat | H04L 45/00 370/395.31 |
| 2010/0172249 | A1* | 7/2010 | Liu | H04L 45/124 370/252 |
| 2010/0242092 | A1* | 9/2010 | Harris et al. | 726/3 |
| 2011/0064079 | A1* | 3/2011 | Lim | H04L 12/185 370/390 |
| 2011/0096668 | A1* | 4/2011 | Bloch | H04L 45/38 370/237 |
| 2011/0228789 | A1* | 9/2011 | Jia | H04L 49/201 370/401 |
| 2011/0267952 | A1* | 11/2011 | Ko et al. | 370/237 |
| 2011/0268118 | A1* | 11/2011 | Schlansker | H04L 12/4641 370/392 |
| 2012/0093023 | A1* | 4/2012 | Ficet | H04L 41/12 370/252 |
| 2012/0182865 | A1* | 7/2012 | Andersen | H04L 1/22 370/228 |
| 2013/0039169 | A1* | 2/2013 | Schlansker | H04L 45/04 370/225 |
| 2013/0159548 | A1* | 6/2013 | Vasseur | H04L 45/125 709/239 |
| 2015/0023214 | A1* | 1/2015 | Soneda | H04W 40/32 370/254 |

OTHER PUBLICATIONS

Izmailov, Rauf et al., "Administrative Weight Allocation for PNNI Routing Algorithms," High Performance Switching and Routing, 2001 IEEE Workshop, May 29-31, 2001, pp. 347-352, XP010542826.

PCT International Search Report for PCT Application No. PCT/FR2011/051080, mailed Aug. 9, 2011.

* cited by examiner

METHOD OF OPTIMIZING ROUTING IN A CLUSTER COMPRISING STATIC COMMUNICATION LINKS AND COMPUTER PROGRAM IMPLEMENTING THAT METHOD

CROSS REFERENCE TO RELATED APPLICATIONS

This application is a U.S. National Phase under 35 U.S.C. §371 of International Application PCT/FR2011/051080, filed May 13, 2011, which designated the U.S., and which claims priority under 35 U.S.C. §119 to France Patent Application Number 1002126, filed May 20, 2010. The disclosures of the above-described applications are hereby expressly incorporated by reference in their entireties.

BACKGROUND

Field of the Invention

The present invention concerns the routing in a cluster, that is to say the determination of communication routes between a set of nodes of the cluster, and more particularly a method of optimizing routing in a cluster comprising static communication links and a computer program implementing that method.

Description of Related Technology

High Performance Computing (HPC) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), others for storing data (storage nodes) and one or more others manage the cluster (administration nodes). Each node is for example a server implementing an operating system such as Linux (Linux is a trademark). The connection between the nodes is, for example, made using Ethernet or Infiniband communication links (Ethernet and Infiniband are trademarks).

Figure 1:
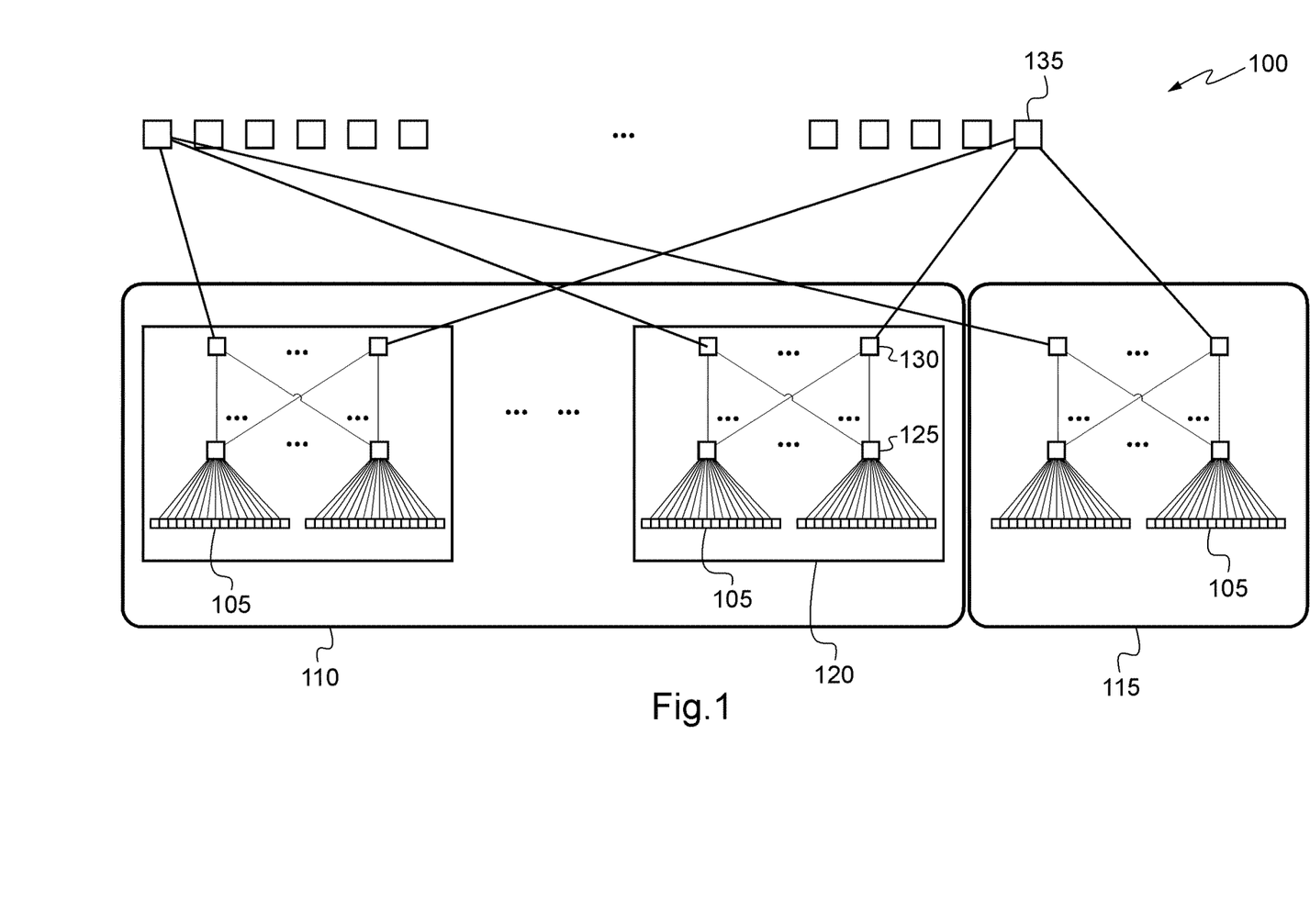
FIG. 1 illustrates an example of topology for a cluster.

FIG. 1 is a diagrammatic illustration of an example of a topology 100 for a cluster, of fat-tree type. The latter comprises a set of nodes of general reference 105. The nodes belonging to the set 110 are compute nodes here whereas the nodes of the set 115 are service nodes (storage nodes and administration nodes). The compute nodes may be grouped together in sub-sets 120 called compute islands, the set 115 being called a service island.

The nodes are linked together by switches, for example hierarchically. In the example illustrated in FIG. 1, the nodes are connected to first level switches 125 which are themselves linked to second level switches 130 which in turn are linked to third level switches 135.

Figure 2:
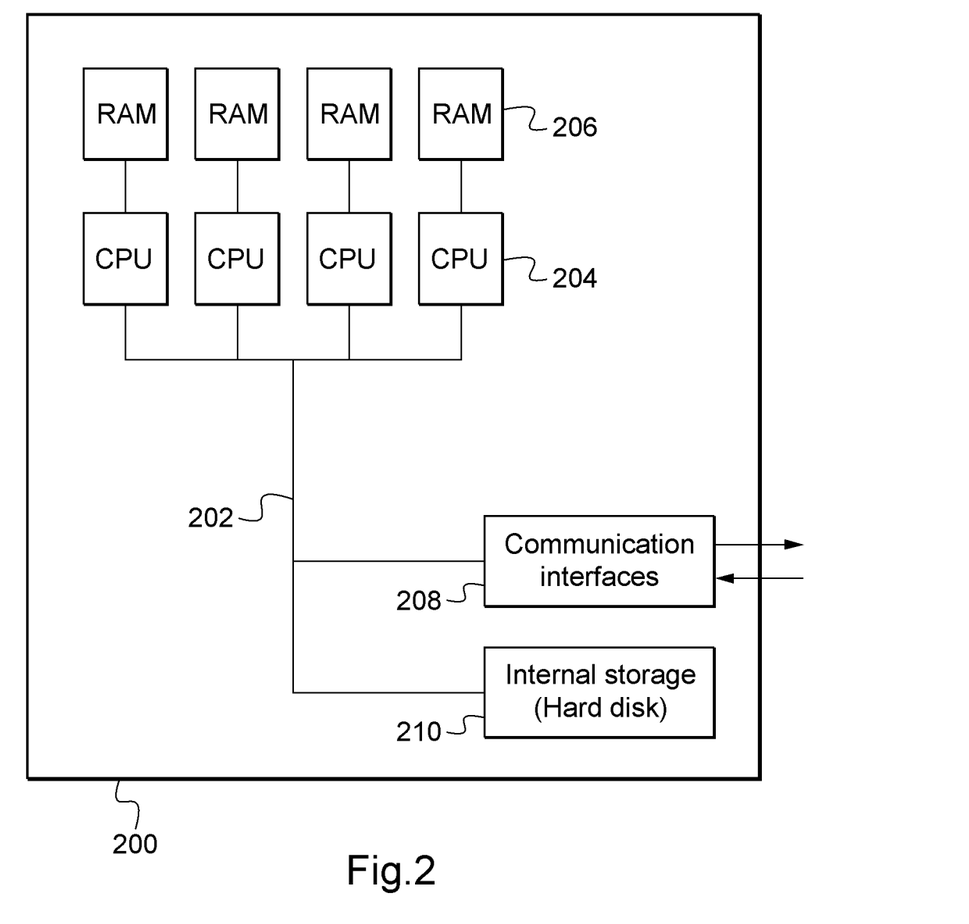
FIG. 2 illustrates an example of architecture for a node of a cluster.

As illustrated in FIG. 2, each node generally comprises one or more microprocessors, local memories and a communication interface. More specifically, the node 200 here comprises a communication bus 202 to which there are connected:

central processing units (CPUs) or microprocessors 204;
components of random access memory (RAM) 206, comprising registers adapted to record variables and parameters created and modified during the execution of programs (as illustrated, each random access memory component may be associated with a microprocessor); and,
communication interfaces 208 adapted to send and to receive data.

The node 200 furthermore possesses here internal storage means 212, such as hard disks, able in particular to contain the executable code of programs.

The communication bus allows communication and interoperability between the different elements included in the node 200 or connected to it. The microprocessors 204 control and direct the execution of the instructions of portions of software code of the program or programs. On powering up, the program or programs which are stored in a non-volatile memory, for example a hard disk, are transferred into the random access memory 206.

It is observed here that the performance of a cluster is directly linked to the quality of the routes enabling the transfer of data between the nodes, that are established via communication links. In general terms, physical communication links are established between the nodes and the switches at the time of the hardware configuration of a cluster, the communication routes themselves being determined in an initialization phase on the basis of a definition of the connections to be established between the nodes. According to the communication technology implemented, the configuration of the routes may be static or dynamic.

By way of illustration, the Infiniband technology enables, in a cluster, a static configuration of the routes. This configuration uses static routing tables, known as Linear Forwarding Tables (LFTs), in each switch. When this technology is implemented, a routing algorithm such as the algorithms known under the names FTree, MINHOP, UPDN and LASH may be used.

In simplified manner, the FTree algorithm determines routes such that they are distributed as much as possible through existing communication links. For these purposes, at the time of the routing of a communication network fully connected in accordance with an FTree type architecture, each node of the network is considered as having the same importance. Thus, when a route is established between two nodes of the same link, the number of routes using that link, called the load of the link, is increased by one. When the routing algorithm seeks to establish a new route and there are several possibilities, it compares the load levels associated with the links on which those possibilities are based and chooses the one whose links have the lowest load level.

The routing quality may be expressed in terms of the number of routes per link.

FIG. 3, comprising FIGS. 3a to 3e, illustrates this routing principle in a switch 300 at the time of an initialization phase of a cluster comprising that switch.

Figure 3A:
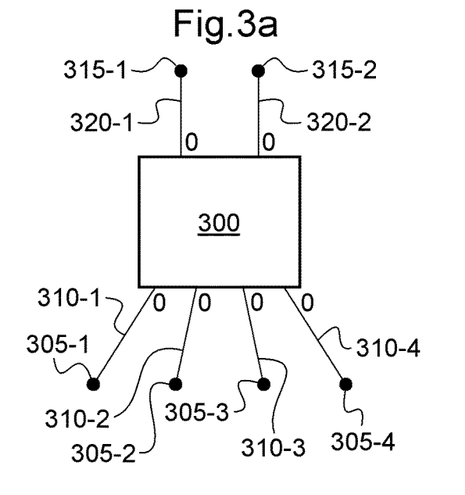
FIGS. 3a to 3e, illustrates the routing principle, according to an FTree type algorithm, in a switch at the time of an initialization phase of a cluster comprising that switch.
Figure 3B:
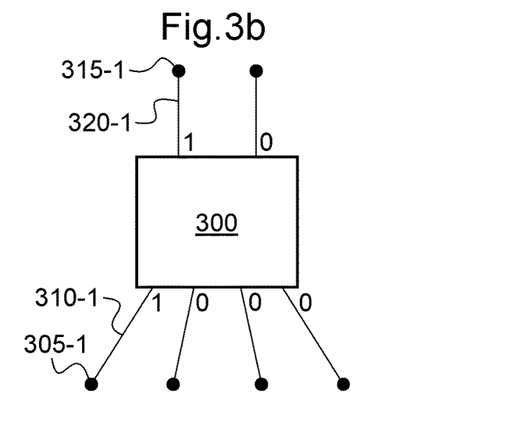

The switch 300 here has four input communication links, denoted 310-1 to 310-4, linking the switch 300 to inputs 305-1 to 305-4 and two output communication links, denoted 320-1 and 320-2, linking the switch 300 to outputs 315-1 and 315-2. Prior to initialization, none of the links 310-1 to 310-4, 320-1 and 320-2 comprises any route. The load levels associated with those links are thus zero as illustrated in FIG. 3a beside each link. Then, when a route is to be established between the input 305-1 and an output of the switch 300, the link 310-1 (the only one able to be used) is selected as well as the link 320-1 (as the load levels associated with the links 320-1 and 320-2 are, here, equal to zero, the first link is selected). The load levels associated with the links 310-1 and 320-1 are then incremented by one to indicate that those links are implementing an additional route, as illustrated in FIG. 3b.

Figure 3C:
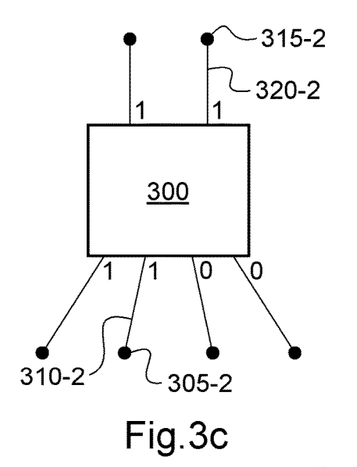
Figure 3D:
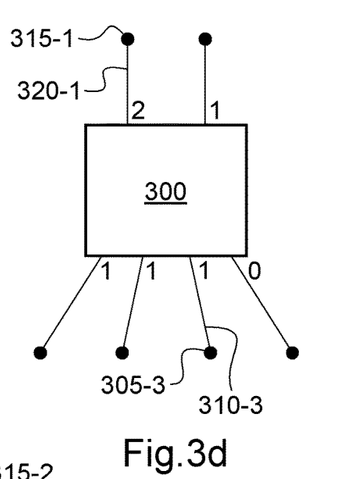

In the same way, when a route is to be established between the input 305-2 and an output of the switch 300, the link 310-2 (the only one able to be used) is selected as well as the link 320-2 (as the load level associated with the link 320-1 is equal to one and the load level associated with the link 320-2 is equal to zero, the latter link is selected). The load levels associated with the links 310-2 and 320-2 are then incremented by one to indicate that those links are implementing an additional route, as illustrated in FIG. 3c. In similar manner, when a route is to be established between the input 305-3 and an output of the switch 300, the link 310-3 (the only one able to be used) is selected as well as the link 320-1 (as the load levels associated with the links 320-1 and 320-2 are equal, the first link is selected). The load levels associated with the links 310-3 and 320-1 are then incremented by one to indicate that those links are implementing an additional route, as illustrated in FIG. 3d.

Figure 3E:
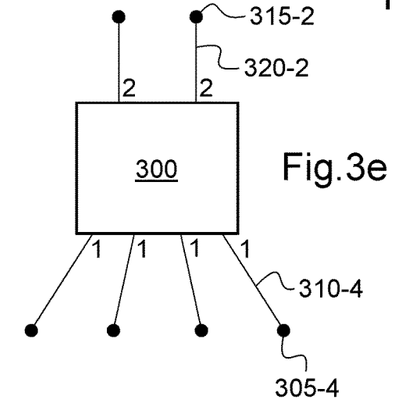

Lastly, when a route is to be established between the input 305-4 and an output of the switch 300, the link 310-4 (the only one able to be used) is selected as well as the link 320-2 (as the load level associated with the link 320-1 is equal to two and the load level associated with the link 320-2 is equal to one, the latter link is selected). The load levels associated with the links 310-4 and 320-2 are then incremented by one to indicate that those links are implementing an additional route, as illustrated in FIG. 3e. When all the routes between the nodes have been established, the static routing tables for the switches are updated.

However, although these routing algorithms give good results, they are not optimal.

SUMMARY OF CERTAIN INVENTIVE ASPECTS

One inventive aspect relates to a computer method for optimizing routing in a cluster comprising a plurality of nodes, static communication links linking nodes of thethe plurality of nodes, the routing being based on load levels associated with the communication links, the method comprising the following steps,
  identifying at least two nodes of the cluster, a connection having to be established between the at least two identified nodes;
  determining at least one route connecting the at least two identified nodes according to the communication links, the at least one route being determined according to the at least two identified nodes, a plurality of communication links of the communication links and at least one load level associated with each communication link of the plurality of communication links, and selecting a determined route;
  estimating a weight value associated with the selected route; and
  incrementing a load level associated with each communication link of the selected route.

In some aspects it is possible to optimize the routing of a cluster by associating weights with routes in order to favor or disfavor certain routes relative to others according to characteristics of the cluster and of the nodes employed.

The method may further comprise obtaining a type of node for at least one of the at least two identified nodes, the estimated value of the weight being at least partially estimated according to the obtained type of node. In some aspects it possible to optimize the routing of a cluster according to types of nodes.

According to a particular embodiment, the method further comprises a step of obtaining a reference of a group to which belongs at least one of the at least two identified nodes, the estimated value of the weight being at least partially estimated according to the group reference obtained. The method according to the invention thus makes it possible to optimize the routing of a cluster according to types of nodes without it being necessary to individually characterize each node. A type and/or a group of nodes is, preferably, determined according to the nature of the corresponding nodes.

Still according to a particular embodiment, the method further comprises a step of establishing a weight array, the weight array representing weights of routes according to node identifiers, types and/or groups of nodes, the step of estimating a weight value using the weight array. The management of the weights according to characteristics of the nodes is thus particularly simple to implement.

The method may further comprise establishing the selected route between the at least two identified nodes.

Still according to a particular embodiment, the method further comprises a step of updating at least one static routing table, the at least one static routing table being associated with at least one switch of the cluster, the at least one switch linking at least the at least two nodes. The method according to the invention may thus be implemented easily, in particular in conventional architectures using switches provided with static routing tables.

In some aspects, routes are advantageously selected in order of the value of the weight associated with them in order to simplify the routing, routes associated with low weights being easier to define than the routes associated with higher weights.

The communication links employed may in particular be of Infiniband type.

Inventive aspects also relate to a computer program comprising instructions adapted for the implementation of each of the steps of the method described earlier when the program is executed on a computer. The advantages procured by that computer program are similar to those referred to above.

BRIEF DESCRIPTION OF THE DRAWINGS

The following detailed description, given by way of non-limiting example, relative to the accompanying drawings in which:
FIG. 3, comprising
FIG. 4, comprising

DETAILED DESCRIPTION OF CERTAIN INVENTIVE EMBODIMENTS

It has been observed that if the routes of a communication network in a cluster are of the same nature, the nature of the nodes linked by those routes plays a role with regard to the volume of data exchanged and thus with regard to the bandwidth used. Thus, for example, a route connecting two compute nodes generally uses less bandwidth than a route connecting a compute node to a storage node.

The invention is thus directed to the use of the nature of the nodes of a cluster to attribute a weight, or a weighting coefficient, to the routes connecting those nodes at the time of the routing. The assignment of weights to routes connecting certain types of nodes of a cluster makes it possible to bias the routing algorithm used in relation to certain routes and, consequently, to optimize the allocation of bandwidth to each route in the communication links employed.

In a conventional manner, when the routing algorithm used establishes a route between two nodes and there are several possibilities, it compares the load levels associated with those possibilities, that is to say, typically, the number of routes using the links corresponding to those possibilities, and chooses the one whose load level is the lowest. However, in accordance with the invention, when a route is established between two nodes, the load level of the communication links supporting that route is incremented according to a weight whose value is linked to the types of those two nodes.

The assignment of a given weight to certain types of routes makes it possible to bias the routing in favor of certain routes which have specific needs in terms of bandwidth. Thus, by using a weight whose value is high for a route connecting two nodes, it is possible to allocate a higher bandwidth to the communication of data between those nodes.

The assignment of weight to routes during a routing phase may be performed through an application program interface (API).

According to a particular embodiment, a weight file, called weight_file, is used to assign weights to routes defined by port identifiers, called port GUIDs (standing for Globally Unique IDentifiers) in a communication network of Infiniband type.

Such a file is analyzed before the routing phase. It contains a list of the communicating elements of the communication network, typically nodes, grouped by type, and a list of weights for pairs formed between those groups. At the time of their analysis, those weights may be used for filling an array that describes the load increment to be used for each communication link during the routing phase. By default, when the value of a weight for a route connecting two types of nodes is not defined, its value is equal to one.

When a route is established through a set of links during the routing phase, the load level associated with each of those links is incremented by the value of the weight linked to the types of nodes between which the route is established.

FIG. 4, comprising FIGS. 4a to 4d, illustrates this routing principle in a switch 400 at the time of an initialization phase of a cluster comprising that switch.

Like the switch 300 illustrated in FIG. 3, the switch 400 here has four input communication links, denoted 410-1 to 410-4, linking the switch 400 to inputs 405-1 to 405-4 and two output communication links, denoted 420-1 and 420-2, linking the switch 400 to outputs 415-1 and 415-2. The inputs are, for example, outputs from nodes of the network or outputs of other switches.

Figure 4A:
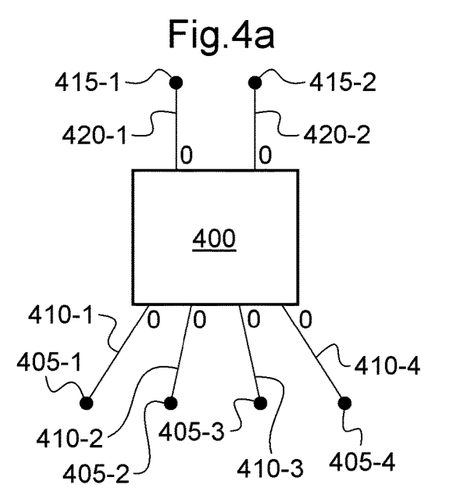
FIGS. 4a to 4d, illustrates an example of the principle of routing with weights, in a switch, in accordance with the invention, at the time of an initialization phase of a cluster comprising that switch; and,
  FIG. 5 is a diagrammatic illustration of an example algorithm implemented to determine and select a route connecting two nodes, during a phase of routing a communication network using static communication links, as well as to determine the load level of a communication link after the selection of a route.
Figure 4B:
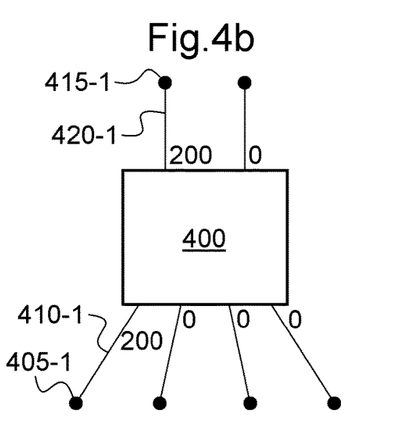

Prior to initialization, none of the links 410-1 to 410-4, 420-1 and 420-2 comprises any route. The load level associated with each of those links is thus zero as illustrated in FIG. 4a beside each link. Then, when a route is to be established between the input 405-1 and an output of the switch 400, the link 410-1 (the only one able to be used) is selected as well as the link 420-1 (as the same zero load level is associated with the links 420-1 and 420-2, the first link is selected). It is assumed here that the object of the route using the links 410-1 and 420-1 which has just been established is to connect a compute node to a storage node. Consequently, if the weight value of a route connecting nodes of computation and storage type is 200, that value is used to increment the load level of the links 410-1 and 420-1, as illustrated in FIG. 4b.

In the same way, when a route is to be established between the input 405-2 and an output of the switch 400, the link 40-2 (the only one able to be used) is selected as well as the link 420-2 (as a load level equal to 200 is associated with the link 420-1 and a zero load level is associated with the link 420, the latter, whose load level has the lowest value, is selected).

Figure 4C:
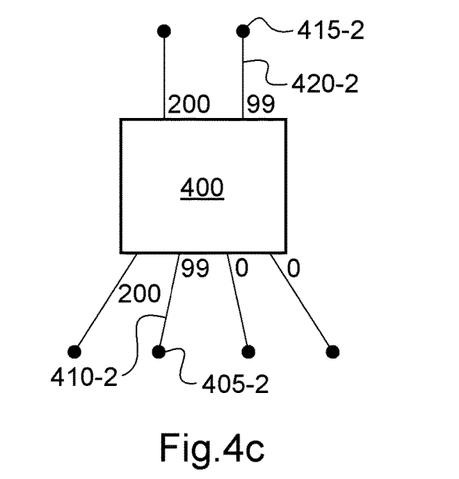

Again, if it is accepted that the object of the route using the links 410-2 and 420-2 which has just been established is to connect a service node to a compute node and that the weight value of a route connecting nodes of service and computation type is 99, that value is used to increment the load of the links 410-2 and 420-2, as illustrated in FIG. 4c.

Figure 4D:
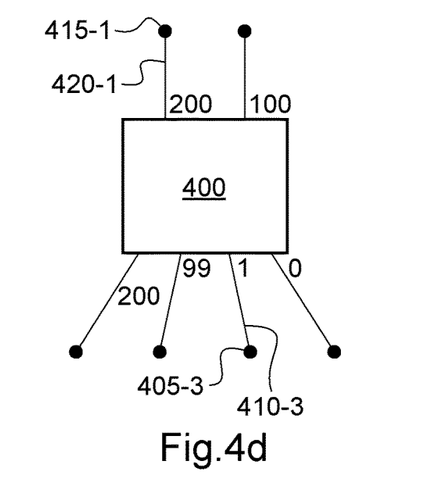

In similar manner, when a route is to be established between the input 405-3 and an output of the switch 400, the link 410-3 (the only one able to be used) is selected as well as the link 420-2 (as a load level equal to 200 is associated with the link 420-1 and a load level equal to 99 is associated with the link 420, the latter, whose load level has the lowest value, is selected). If it is accepted that the object of the route using the links 410-3 and 420-2 which has just been established is to link two computation nodes and that the weight value of a route connecting nodes of computation type is 1, that value is used to increment the load of the links 410-3 and 420-2, as illustrated in FIG. 4d.

This method is advantageously applied to determine all the routes of the cluster at the time of its initialization.

Furthermore, at the time of the routing phase, the routes are, preferably, determined in an ordered manner such that a route associated with a weight of value greater than that of a weight of another route is determined before that other route in order to optimize the routing. This order may be determined from the weight array and groups of nodes making it possible to identify them on the basis of their type.

An extract of a weight file is presented in an appendix hereto (extract 1). It illustrates an example of grouping of nodes of a communication network, each group here representing distinct types of nodes, as well as the attribution of weight to node type pairs.

According to this example, the nodes having the values 0x100901, 0x101201, 0x100903, 0x1101203, 0x101207, 0x100909 and 0x101209 as port GUIDs are nodes of "storage" type. The definition of a node type is made here using the indication DEF followed by the name of the group itself followed by the list of the corresponding port GUIDs, placed between curly brackets. Similarly, the nodes having the values 0x100905, 0x101205 and 0x100907 as port GUIDs are nodes of "admin" type, that is to say administration nodes. Similarly, the nodes having the values 0x10090b, 0x010120b, 0x10090d, 0x10120d, 0x10090f, 0x10120f, 0x100911, 0x101211, 0x100913, 0x101213, 0x100915, 0x100917, 0x101217 and 0x100919 as port GUIDs are nodes of "compute" type. Furthermore, a node type called "service" groups together all the nodes of "storage" and "admin" type.

The weights are given here at the end of the file. The syntax to define the weight of a route connecting two nodes here uses the formulation "ID1=>ID2 weight" where ID1 is the port GUID or the originating group of the node, ID2 is the port GUID or the recipient group of the node and weight is the value to be used during the calculation of the load level for a link. According to this example, a weight value equal to 200 is added to all the routes going from a compute node, i.e. a node of "compute" type, to a storage node, i.e. a node of "storage" type (<<compute=>storage 200>>). Similarly, a weight value equal to 99 is added to all the routes going from a service node, i.e. a node of "service" type, to a compute node, i.e. a node of "compute" type (<<service=>compute 99>>). In the same way, a weight value equal to 200 is added to all the routes going from an administration node, (a node of "admin" type), to a storage node, i.e. a node of "storage" type (<<admin=>storage 200>>).

According to a particular embodiment, if the weight associated with a route linking two types of nodes appears several times in the weight configuration file, the weight associated with that route is equal to the cumulative amount of the specified weights Naturally, other weights may be defined. Similarly, a different syntax may be used. Moreover, if, according to the examples given previously, the routes are considered as being directional, the load level associated with a route may be the same as that associated with the reverse route as if the routes were bidirectional.

Figure 5:
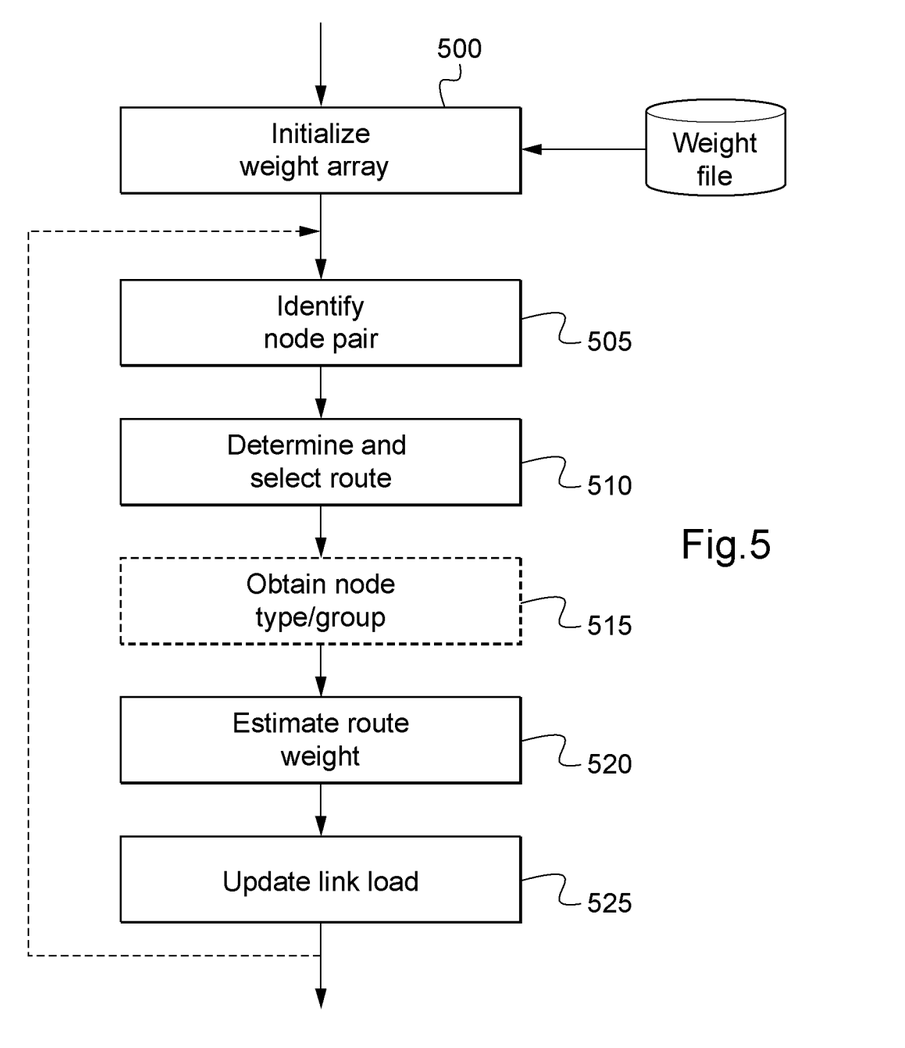

FIG. 5 is a diagrammatic illustration of an example algorithm implemented to determine and select a route connecting two nodes, during a phase of routing a communication network using static communication links, as well as to determine the load level of a communication link after the selection of a route.

A first step (step 500) is directed to the initialization of a weight array enabling a weight to be associated with a pair of nodes formed from two nodes (the same weight whatever the direction of the route) or from an originating node and a recipient node (weight linked to the direction of a route) as illustrated in the appendix (table 1). This array may in particular be established from a weight file such as the one presented in the appendix (extract 1). This step also makes it possible to store the matches between an identifier of a node and its type and/or one or more groups to which it belongs. Alternatively, the weight array may directly establish the weights associated with each pair of nodes as partially illustrated in the appendix (table 2).

Table 1 indicates the weight to be attributed to a route connecting a source node type to a recipient node type whereas table 2 indicates the weight to be attributed to a route connecting a source node to a recipient node.

In a following step (step 505), a pair of nodes between which a route is to be established is identified. The pair of nodes here comprises a source node and a recipient node. This step is a basic step of the routing algorithms to enable definition of the routes to be established. The nodes are, for example, identified according to port GUIDs.

The steps of determining possible routes to connect those identified nodes and of selecting the best route are then carried out (step 510) according to a standard algorithm, for example according to the FTree algorithm.

In a following step (step 515), the type of the identified nodes or the group or groups to which they belong are obtained according to the information obtained during the initialization step. As suggested by the use of dashed line, this step is optional since if, in particular, the weight array determined during the initialization phase directly associates weights with the identifiers of the nodes, it is not necessary, at this stage, to determine the type thereof and/or to determine the group or groups to which they belong.

The types of the nodes, the group or groups to which they belong and/or their identifier, for example their port GUID, are then used to estimate the weight of the route connecting those nodes (step 520). The weight is, preferably, given directly by reading the weight array determined in advance. Alternatively, a weight may be estimated according to a reference stored in the weight array according to a predetermined function or table. The weights coming from the weight array may also be increased or reduced according to particular circumstances linked, for example, to the topology of the cluster and to the position of the links implemented by the route considered.

The weight estimated for the selected route is then used to update the load level associated with the communication links implemented by the route considered (step 525). As described earlier, the value of the estimated weight may be added to the load level of the communication links employed by the route considered.

As suggested by the arrow in dashed line, steps 505 to 525 may be repeated to establish new routes. Typically, steps 505 to 525 are repeated for all the routes to be established in the cluster in which the algorithm illustrated in FIG. 5 is implemented.

It is observed here that this algorithm may, for example, be implemented in a device whose architecture is similar to that described with reference to FIG. 2.

This algorithm is implemented in the network manager running on an administration node.

Furthermore, it is observed that the use of weight in a routing algorithm is compatible with a quality of service (QoS) management algorithm. It is to be recalled here that quality of service management, typically based on levels of service and credits associated with each route according to a virtual link concept, makes it possible to favor certain routes in case of contention of the network. This management is thus independent of the routing in itself. These two approaches are thus complementary to improve the transmission of data in a cluster and thus improve the performance of the latter.

While the above embodiments have been described with reference to the accompanying drawings, it is to be understood that the present disclosure is not limited to the disclosed embodiments, but, on the contrary, is intended to cover various modifications and equivalent arrangements included within the spirit and scope of the appended claims.

APPENDIX

Extract 1

DEF storage {
  0 × 100901
  0 × 101201
  0 × 100903
  0 × 1101203
  0 × 101207
  0 × 100909
  0 × 101209
}
DEF admin {
  0 × 100905
  0 × 101205
  0 × 100907
}
DEF service {
  storage
  admin
}

APPENDIX-continued

Extract 1

```
DEF compute {
    0 × 10090b
    0 × 10120b
    0 × 10090d
    0 × 10120d
    0 × 10090f
    0 × 10120f
    0 × 100911
    0 × 101211
    0 × 100913
    0 × 101213
    0 × 100915
    0 × 100917
    0 × 101217
    0 × 100919
}
compute = > storage 200
service = > compute 99
admin   = > storage 200
```

TABLE 1

| source | dest. | | | |
|---|---|---|---|---|
| | storage | admin | service | compute |
| storage | 1 | 1 | 1 | 99 |
| admin | 200 | 1 | 1 | 99 |
| service | 1 | 1 | 1 | 99 |
| compute | 200 | 1 | 1 | 1 |

TABLE 2

| source | dest. | | | | |
|---|---|---|---|---|---|
| | 0x100901 | 0x101201 | 0x100903 | ... | 0x100919 |
| 0x100901 | — | 200 | 200 | ... | 1 |
| 0x101201 | 200 | — | ... | ... | 1 |
| 0x100903 | 200 | 200 | — | ... | 1 |
| ... | ... | ... | ... | — | ... |
| 0x100919 | 200 | 200 | 200 | ... | — |

The invention claimed is:

1. A computerized method of optimizing routing in a cluster comprising a plurality of nodes, static communication links linking nodes of the plurality of nodes, the routing being based on load levels associated with the communication links, the method comprising:
   identifying at least two nodes of the cluster, a connection having to be established between the at least two identified nodes;
   determining at least one route connecting the at least two identified nodes according to the communication links, the at least one route being determined according to the at least two identified nodes, a plurality of communication links of the communication links and at least one load level associated with each communication link of the plurality of communication links, and selecting a determined route;
   obtaining a node type for at least one of the at least two identified nodes, wherein the obtained node type indicates that the at least one identified node primarily performs storage tasks, computation tasks, or management tasks with respect to its role in the cluster;
   estimating a weight value associated with the selected route based at least in part on the obtained node type; and
   incrementing or decrementing a load level associated with each communication link of the selected route by an amount based at least in part on the estimated weight value.

2. The method according to claim 1, further comprising obtaining a reference of a group to which belongs at least one of the at least two identified nodes, the estimated value of the weight being at least partially estimated according to the group reference obtained.

3. The method according to claim 1, wherein a type and/or a group of nodes is determined according to the nature of the corresponding nodes.

4. The method according to claim 1, further comprising establishing a weight array, the weight array representing weights of routes according to node identifiers, types and/or groups of nodes, wherein the estimating of the weight value is performed using the weight array.

5. The method according to claim 1, further comprising establishing the selected route between the at least two identified nodes.

6. The method according to claim 1, further comprising updating at least one static routing table, the at least one static routing table being associated with at least one switch of the cluster, the at least one switch linking at least the at least two nodes.

7. The method according to claim 1, wherein routes are selected in order of the value of the weight associated with them.

8. The method according to claim 1, wherein the communication links are of Infiniband type.

9. A non-transitory computer readable medium comprising instructions that when executed by a processor perform the method of:
   identifying at least two nodes of a cluster, a connection having to be established between the at least two identified nodes;
   determining at least one route connecting the at least two identified nodes according to the communication links, the at least one route being determined according to the at least two identified nodes, a plurality of communication links of the communication links and at least one load level associated with each communication link of the plurality of communication links, and selecting a determined route;
   obtaining a node type for at least one of the at least two identified nodes, wherein the obtained node type indicates that the at least one identified node primarily performs storage tasks, computation tasks, or management tasks with respect to its role in the cluster;
   estimating a weight value associated with the selected route based at least in part on the obtained node type; and
   incrementing or decrementing a load level associated with each communication link of the selected route by an amount based at least in part on the estimated weight value.

10. The method according to claim 1, wherein the determined route that has the lowest load level is selected.

11. The non-transitory computer readable medium according to claim 9, wherein the determined route that has the lowest load level is selected.

* * * * *